United States Patent [19]
MacDonald et al.

[11] 3,967,170
[45] June 29, 1976

[54] POSITION SYNCHRONIZATION OF MACHINES

[75] Inventors: Ian M. MacDonald, Kenosha; Charles J. Cowie, Racine, both of Wis.

[73] Assignee: Eaton Corporation, Cleveland, Ohio

[22] Filed: Oct. 25, 1974

[21] Appl. No.: 517,876

[52] U.S. Cl. ................................................ 318/85
[51] Int. Cl.² ........................................... H02P 7/74
[58] Field of Search ............................... 318/72, 85

[56] References Cited
UNITED STATES PATENTS

| | | | |
|---|---|---|---|
| 2,004,770 | 6/1935 | Setter | 318/72 X |
| 2,848,671 | 8/1958 | McDonald | 318/85 X |
| 3,176,207 | 3/1965 | Wallace | 318/85 X |
| 3,536,968 | 10/1970 | Alabone et al. | 318/85 X |
| 3,600,655 | 8/1971 | Karlin | 318/85 X |
| 3,655,950 | 4/1972 | Greening et al. | 318/85 UX |
| 3,718,845 | 2/1973 | Bejach et al. | 318/85 X |
| 3,718,846 | 2/1973 | Bejach | 318/85 |

*Primary Examiner*—Gene Z. Rubinson
*Attorney, Agent, or Firm*—Teagno & Toddy

[57] ABSTRACT

Apparatus for synchronizing the relative positions of motor-driven machines. Preliminary to operating the machines in synchronism, the rotors of individual synchronous motors that drive the machines are moved to a stop at certain angular positions. The angular positions are such that when inverter voltage is thereafter applied to the stators of all of the motors from a common inverter, the instantaneous angular position of the stator magnetic field with respect to the respective rotor is the same for all of the motors. In one embodiment, several machines are synchronized as to position by first operating each at low speed to a home position. Arrival of each machine at its home position is detected by detecting the simultaneous existence of two signals: (a) a first signal indicating that the instantaneous phase of inverter voltage applied to the stator is within a predetermined range, (b) a second signal indicating that the position of the machine member driven by the respective motor is within a predetermined tolerance range of the home position. Thereupon, if a third signal indicates that the speed of the motor is below a predetermined threshold speed, a brake is applied to hold the machine in its home position. After all of the machines reach their home positions their respective brakes can be released and all motors can be energized from a common inverter in order to operate the machines in positional synchronism.

16 Claims, 13 Drawing Figures

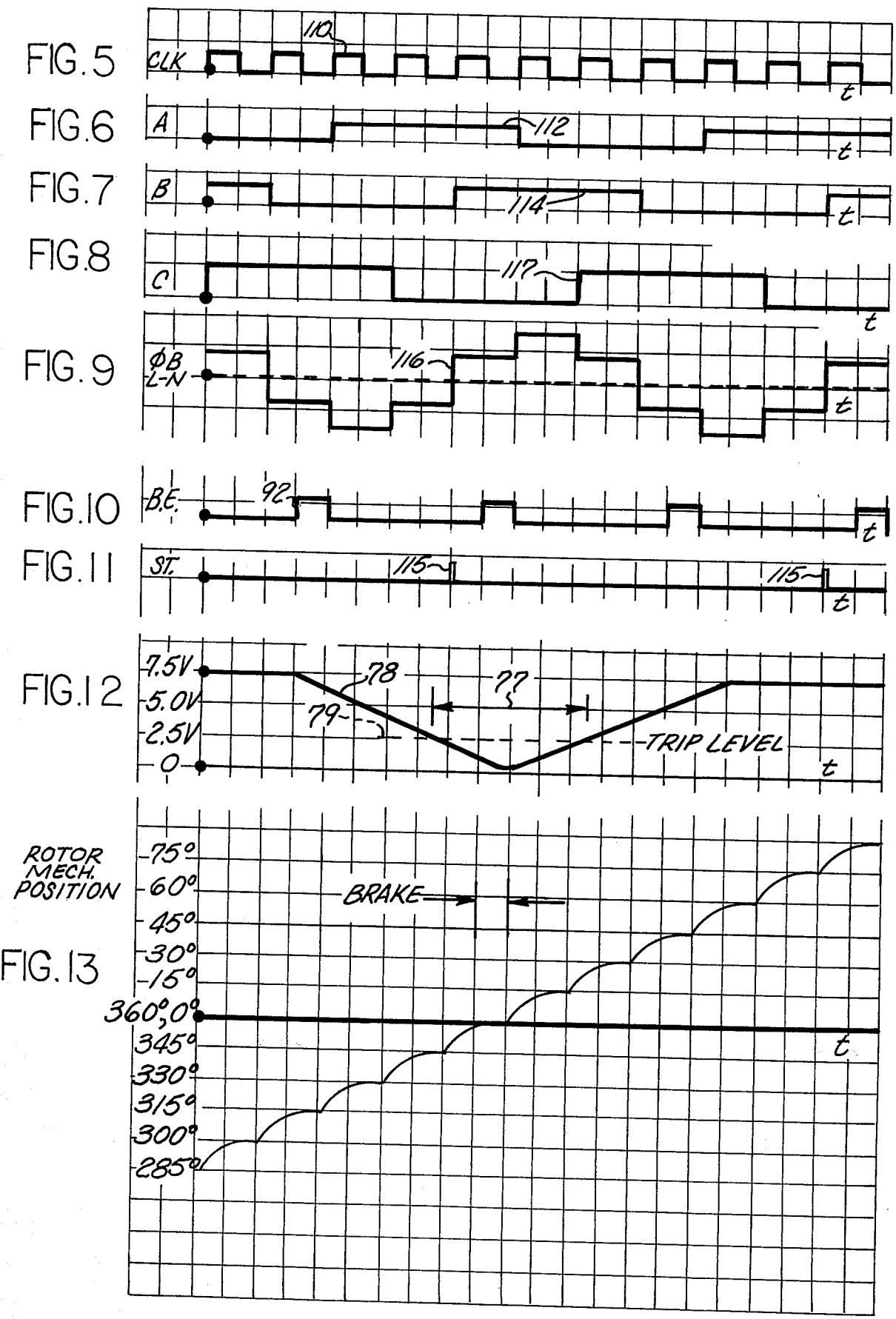

POSITION SYNCHRONIZATION OF MACHINES

BACKGROUND OF THE INVENTION

The present invention relates to control of synchronous motors for driving in synchronism machines or mechanisms which are not mechanically interconnected, and particularly to such motors used to drive independent conveyors which are to be synchronized. It is sometimes desired to operate two machines in synchronism both as to speed and position, for example, when a first conveyor of articles must deliver the articles to a second conveyor, and the conveyors must be synchronized so that the first conveyor delivers each article at a convenient position such as into a holder on the second conveyor. Where each of two conveyors is driven by separate respective drive motor to which it is geared, the relative positions of the conveyors can be controlled by controlling the respective drive motors. The various systems of the prior art for accomplishing position synchronism include systems in which one of the synchronous drive motors is dropped back by slipping past one or more field pole positions of the motor while the motors are running. In another system a separate static inverter is employed to drive each motor and the output frequency of one of the static inverters is temporarily increased or decreased to enable its machine to gain on or to fall back to the other machine. These prior art techniques illustrate the nature of the problem solved by the present invention.

SUMMARY OF THE INVENTION

In the present invention two or more synchronous motors are synchronized by first automatically stopping each with its rotor in a predetermned "home" position with respect to its stator. Upon starting of the motors thereafter, the relative positions of the rotors are maintained, because the armatures of all of the motors are energized with a common phase of electrical excitation. The rotating magnetic armature field that the excitation produces in each motor has an instantaneous angular position relative to the respective rotor that is the same for all of the motors.

In one embodiment of the invention each of several machines has a synchronous motor coupled with a respective movable member; to synchronize the movable members, each of the machines is first driven to a predetermined home position. The presence of each rotor in its home position is detected by sensing the instantaneous phase angle of the inverter signal applied to the stator of the motor while the motor is being operated at the creep speed to reach the home position. To accomplish this a phase detector senses when the phase of the output voltage of an inverter which powers the motors is in a predetermined phase range. Moreover, a position detector produces a signal when a movable member driven by a respective motor is within a predetermined range of its home position. When the ac phase detector signal and the member position detector signals occur, the machine is at its home position and the rotor has a predetermined angular position with respect to its stator. The motor is then de-energized and a brake is applied.

After all of the movable members of the illustrative embodiment are at their home positions they can all be started in synchronism by an ac power source such as an inverter that is used in common by all of the motors. Still later, when the machines are to be stopped, the speed of the motors is required to be below a predetermined threshold speed, in addition to the requirements for the proper member position and pahse signals above, before the motors are completely stopped.

An important aspect of the invention is that, when operating at creep speed each rotor rotates in a cogging stepwise fashion, i.e., with pulsating velocity. The time at which each motor is stopped at its home position is controlled so as to be one of the times when its rotor is in a slower portion of one of its steps of rotation.

LIST OF FIGURES

In the drawings:

FIG. 5 is a graph of clock signal wave form;

FIGS. 6, 7, and 8 are graphs of wave forms for switching on phase A, phase B and phase C main semiconductors of a static inverter;

FIG. 9 is a line-to-neutral output voltage wave form for phase B of the static inverter;

FIG. 10 is a graph of brake enable pulses;

FIG. 11 is a graph of inverter start enable pulses;

FIG. 12 shows the output voltage of a conveyor home position discriminator;

FIG. 13 is a graph of the position of the rotor of a synchronous drive motor for a conveyor, as a function of time when operating at creep speed.

DESCRIPTION OF A PREFERRED EMBODIMENT

Figure 1:
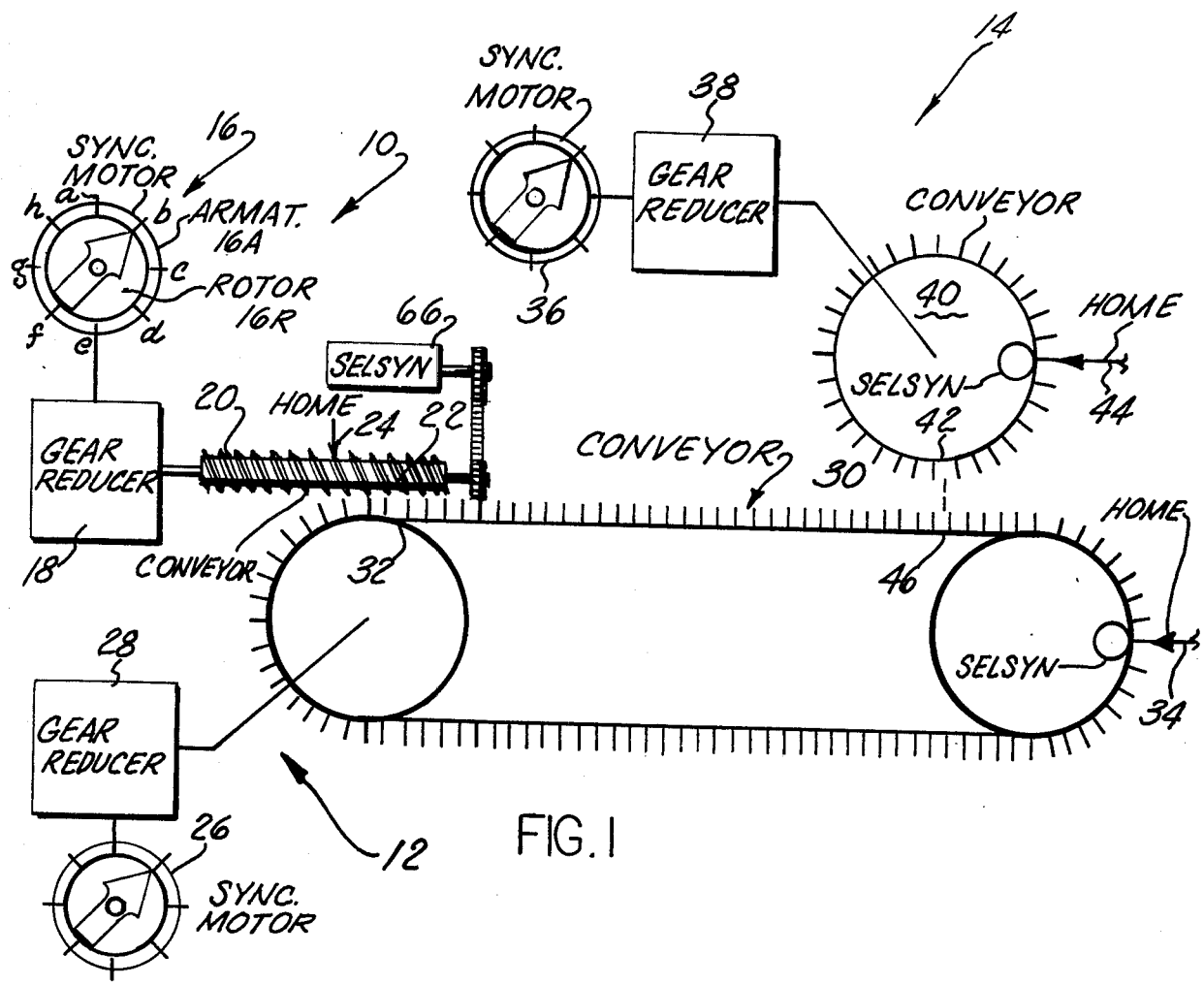
FIG. 1 shows three conveyors whose positions are to be synchronized, and a separate motor for driving each of the conveyors.

In a preferred embodiment of the invention, three machines generally indicated in FIG. 1 by reference numerals 10, 12 and 14 are operated in synchronism. The machine 10 includes an 8-pole reluctance synchronous motor 16 connected with a gear type of speed reducer 18 to drive a movable member, namely a conveyor 20. The conveyor 20 has a plurality of "job positions", for example a job position 22. A job position can be a bin, a holder for one of the articles or products being conveyed, a tool position, a filler tube position, a capper, etc. A stationary location near the conveyor 20 is established as a reference position, designated herein as a conveyor home position 24. As the conveyor 20 moves, the home position is reached once for each job space of movement of the conveyor.

The second machine 12 includes a respective synchronous motor 26, which is connected with a gear reducer 28 to drive a conveyor 30. The conveyor 30 also has job spaces, including for example a job space 32. When any one of the job spaces of the conveyor 30 is in a particular reference location 34 the conveyor is said to be in one of a plurality of home positions. The conveyor 30 has the same number of home positions as it has job spaces.

The conveyor home positions 24, 34 are selected in such a way that when the machine 10 is in one of its home positions at location 24 and the machine 12 is in one of its home positions at location 34 the job spaces of machine 10 are alignment with the job spaces of machine 12, for proper cooperation of the machines 10 and 12. For example, at home positions, the movable members 20 and 30 are located such that the job space 22 is aligned with job space 32.

Similarly, the machine 14 includes a synchronous motor 36 connected with a gear reducer 38 to drive a movable member 40, which has job spaces such as job space 42, and has a reference 44 for home positions. When any of the job spaces of the movable member 40 of machine 14 is at the home position 44, the machine 14 is synchronized with respect to the position of the job spaces of machine 12, provided machine 12 is also then at a home position. For example, the job space 42 of machine 14 is then vertically aligned over a job space 46 of the machine 12, as is required for proper interaction of the machines 12 and 14.

Figure 2:
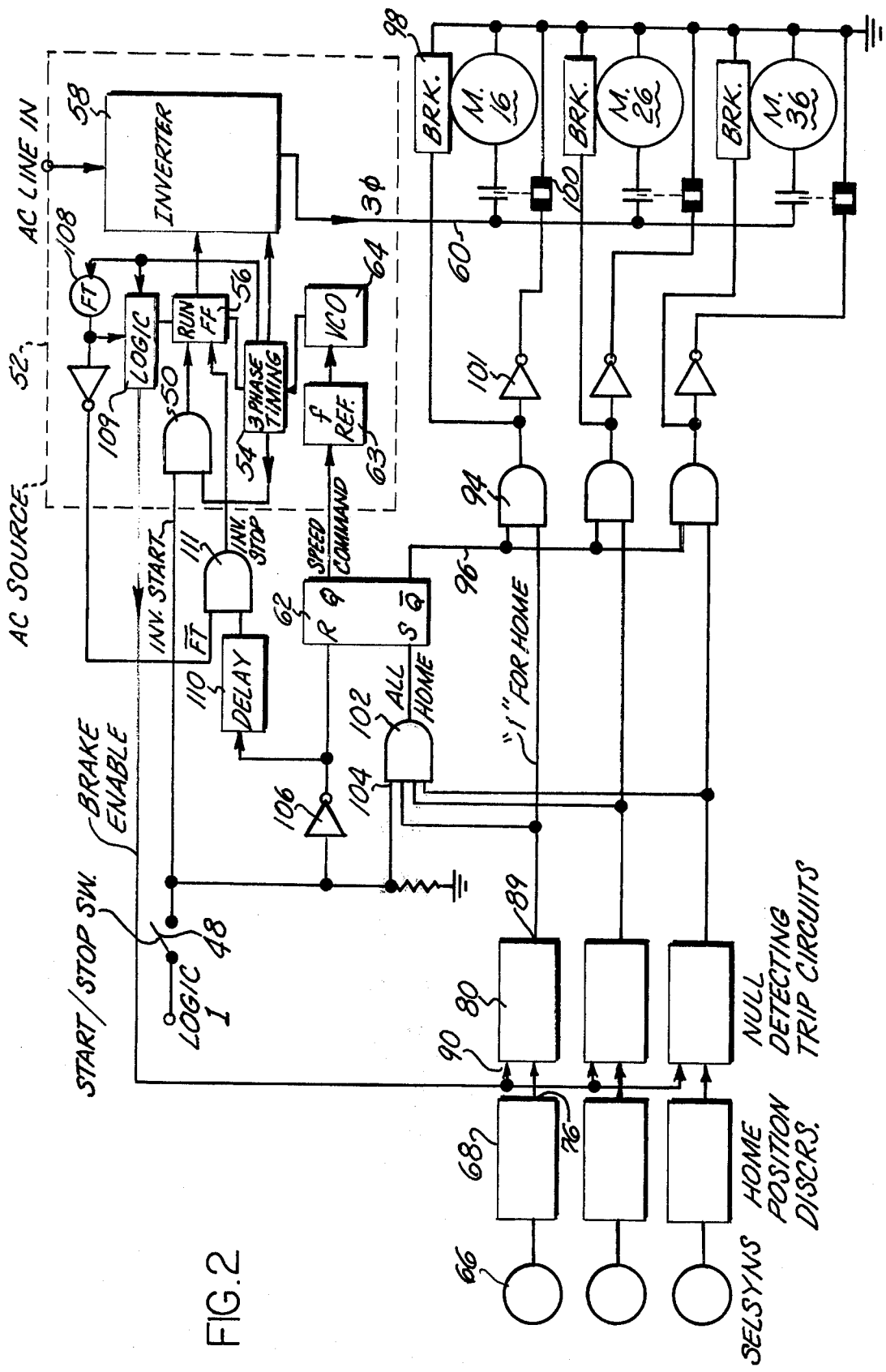
FIG. 2 is a block diagram of a control system for the motors of FIG. 1.

To operate all three machines 10, 12, and 14, synchronously, an inverter start/stop command switch 48 is closed, FIG. 2. The switch 48 applies a logic 1 signal to a first input terminal of an AND gate 50, which is a control component of a three phase ac source generally designated at 52. At the leading edge of the next-occurring positive lobe of phase B switching voltage (graph 114, FIG. 7) produced by a three phase timing circuit 54, a second input terminal of the AND gate 50 receives a logic 1 pulse called the "start enable" pulse, as shown in graph 115, FIG. 11. Thereupon an output signal from the AND gate 50 triggers an "inverter run" flip-flop 56, which enables a static inverter 58 to produce three-phase output power. FIGS. 7 and 11 show the relative timing of the inverter start enable pulses with respect to phase B switching signals. A one-shot multivibrator in the timing circuit 54 produces the start enable pulse 115. The three-phase timing circuit 54 produces various timing signals includng phase A, B and C switching signals 112, 114, 117 as shown in FIGS. 6, 7, and 8 respectively. These switching signals turn on switching sections for phases A, B, and C of the static inverter 58. The design of the timing circuit 54 and of the switching sections of the static inverter 58 require only ordinary skill in the art because of available prior art.

When the static inverter 58 is enabled, three phase output power from the inverter 58 is applied to conductors 60, FIG. 2. The frequency of the inverter 58 at the start is a creep frequency, corresponding to a creep speed of the motors, because a speed command flip-flop circuit 62 initially has a logic O siganl at its Q output terminal, and that signal selects a creep frequency reference voltage in a reference voltage circuit 63 for controlling a voltage-controlled oscillator (VCO) 64. The oscillator 64 produces a train of clock pulses 110 (FIG. 5) for use by counters in the three-phase timing circuit 54.

If any of the conveyors 20, 30, 40 are not at one of their home positions at the references 24, 34, 44, respectively, the respective motors 16, 26, 36, of those conveyors that are not home operate at a creep speed until a home position is reached. To illustrate how this accomplished it is assumed that conveyor 20 is not initially at its home position, perhaps because it was previously jammed.

When the conveyor 20 is not at its home position a null detecting trip circuit 80 has a logic 0 output, as described hereinbelow. This signal is applied to one input terminal of a two-input AND gate 94. The AND gate 94 produces a logic 0 output signal that, after inversion in an inverter 101, energizes a relay 100 whose contacts apply three phase power to the armature of the motor 16. The output of the AND gate 94 also deenergizes a brake 98 to release the brake from machine 10, which allows the motor 16 to advance the conveyor 20 at creep speed toward the home position 24.

Upon arrival of a work space of the conveyor 20 at a home position at reference 24, the null detecting trip circuit 80 produces a logic 1 signal. This results in a 1 at the output of the AND gate 94, because the other input of the AND gate 94 has a logic 0 signal when at creep speed. This de-energizes the relay 100 to remove power from the motor 16, and permits the brake 98 to be applied to hold the machine 10 in its home position. The manner in which a home position detector and a brake enable signal control the timing of the stop signal from the null detecting trip circuit 80 will now be described.

A single phase selsyn transformer 66 is mechanically coupled with the movable machine member 20 as shown in FIG. 1. The movable coil of the selsyn transformer rotates ½ of a revolution during the movement of one job space of the conveyor 20. A primary winding of the selsyn transformer 66 is excited by a single phase 60 Hz source, FIG. 3. An output voltage induced in a secondary winding of transformer 66 becomes zero upon every 180° of rotation of the rotable winding of the selsyn transformer. Hence a null of output voltage from the selsyn transformer occurs once per job space. The windings of the selsyn transformer 66 are angularly arranged such that the nulls of output voltage occur each time a job space of the movable member 20 is at the home position 24.

The occurrence of a null voltage from the selsyn transformer 66 is detected in order to produce a home position signal whenever the movable member 20 is within a predetermined range of its home position 24. As shown in FIG. 2 the output voltage of the selsyn transformer 66 is connected to a home position discriminator 68 whose circuit diagram is included in FIG. 3. The output voltage from the secondary selsyn winding is rectified in a full-wave bridge rectifier 70, filtered by resistance-capacitance filter 72, and clipped by a Zener diode 74. A home position of the conveyor 20 is indicated by a low voltage at the discriminator output terminal 76, as shown at a region 77 of a voltage vs. position graph 78 in FIG. 12.

Figure 3:
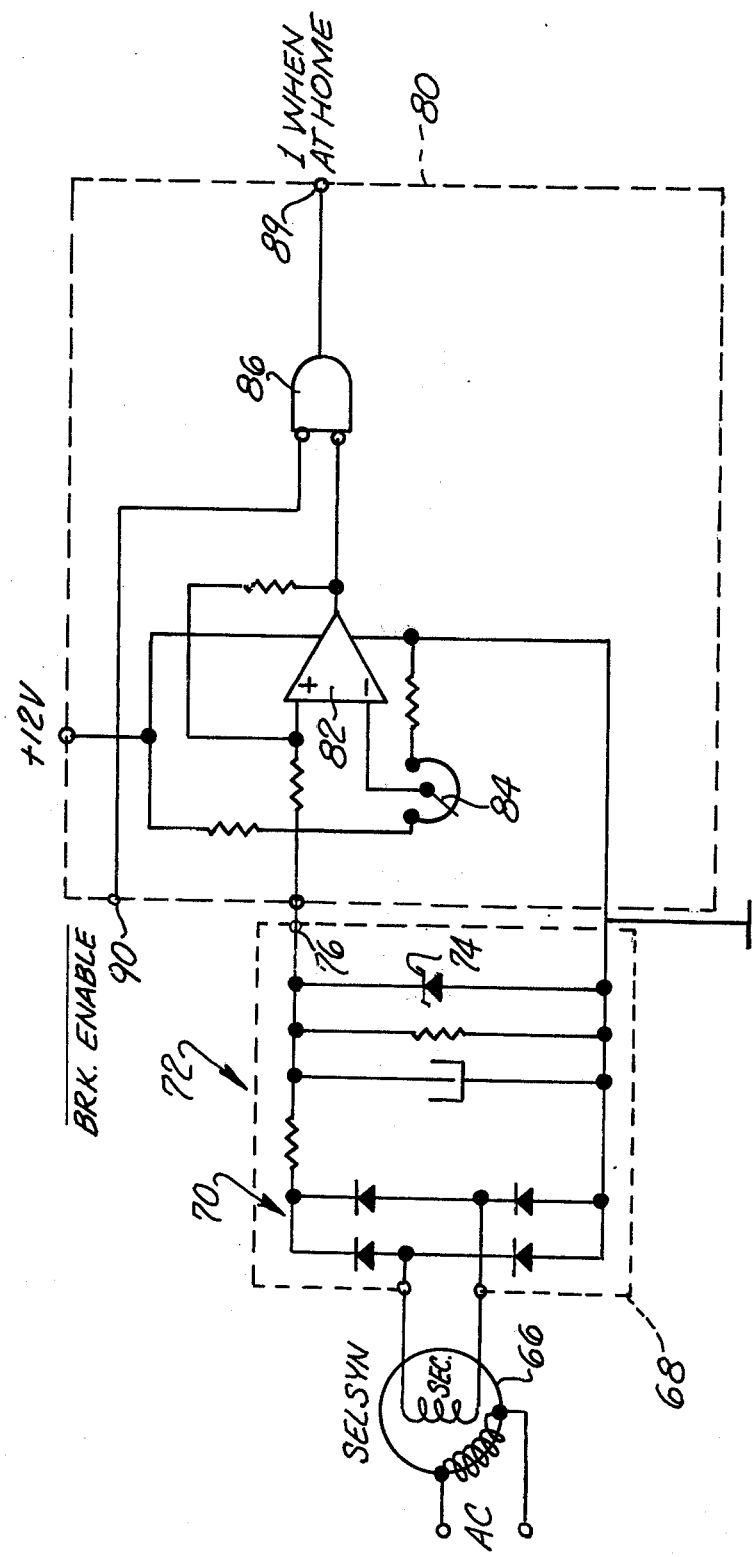
FIG. 3 is an electrical diagram of a position sensing circuit for any one of the conveyors.

The output voltage of the home position discriminator 68 is applied to the null detecting trip circuit 80, FIGS. 2 and 3, where it is compared in a differential amplifier 82 with a reference level voltage that is manually set by a potentiometer 84. The output of differential amplifier 82 is connected to one input of a negated-input NAND gate 86 which has a second input connected to an input terminal 90 to which a brake enable signal is applied. The output of gate 86 is connected to a terminal 89. An output signal at the terminal 89 occurs only during a short time when a brake enable pulse is present at the input terminal 90 of the null detecting trip circuit 80, and the movable member 20 is within a predetermined range of home position. The timing of the brake enable pulses is shown in graph 92 of FIG. 10. Generation of the brake enable pulses will now be described.

The brake enable pulses BE are produced by a logic circuit 109 in accordance with the following logic formula: $BE = (A \cdot B + \overline{A} \cdot \overline{B}) \cdot CLK \cdot \overline{FT}$. A is 1 when the phase A switching circuits of the static inverter 58 are conducting, FIG. 6. B is 1 when the phase B switching circuits are conducting, FIG. 7. CLK represent the clock waveform shown in FIG. 5. FT is the output of a frequency threshold circuit 108; it is a logic 1 when the inverter frequency exceeds a predetermined threshold. The line-to-neutral output voltage wave form of phase B is also shown, without its pulse width modulation notches, as graph 116, FIG. 9.

Figure 4:
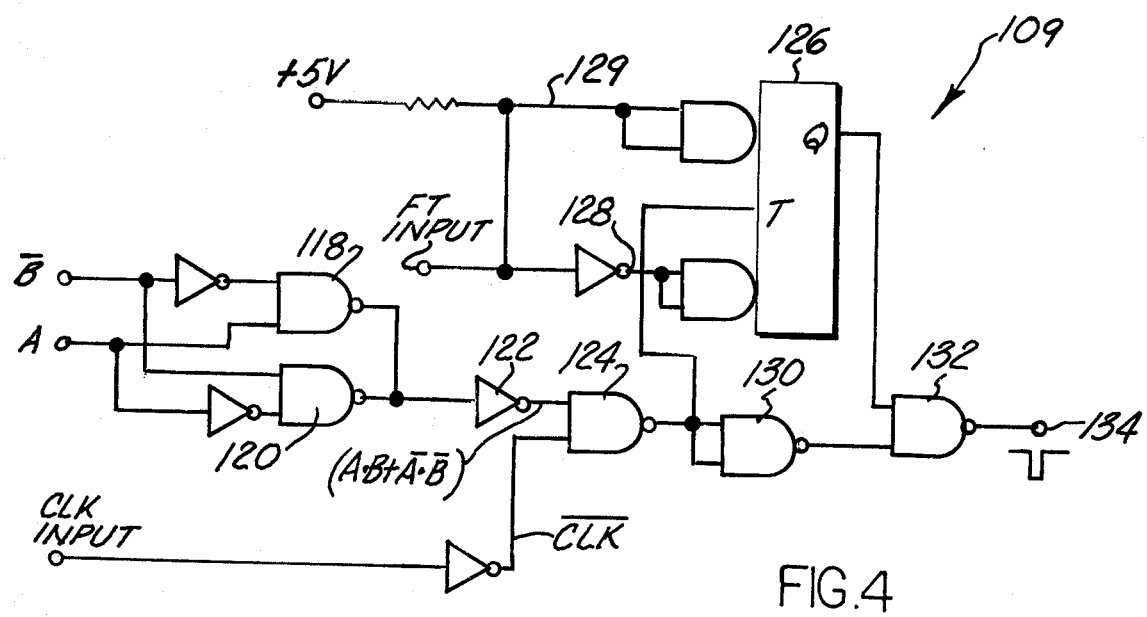
FIG. 4 is a logic circuit for sensing the phase of ac voltage applied to the motors.

FIG. 4 shows the logic circuit for producing the brake enable pulses. Logic signals A and B are inputs to a NAND gate 118 of FIG. 4; logic signals $\overline{A}$ and $\overline{B}$ are inputs to a NAND gate 120. The outputs of NAND gates 118, 120, are connected in a wired AND connection, and inverted by an inverter 122 to produce (A·B + $\overline{A}$·$\overline{B}$). The output of inverter 122 is applied to one input of a NAND gate 124 whose other input is a $\overline{\text{CLK}}$ signal. The output of NAND gate 124 is the inverse of (A·B + $\overline{A}$·$\overline{B}$)·$\overline{\text{CLK}}$. It drives the timing terminal of a flip-flop 126 which thereupon changes state to produce a 1 at its Q output if an FT signal is present at an input 128 and a $\overline{\text{FT}}$ signal is at an input 129 of the flip-flop 126. When a 1 exists at the Q output of flip-flop 126, and a 1 exists simultaneously at the output of an inverting gate 130 that inverts the output of the NAND gate 124, a NAND gate 132 is actuated. Its output, at a terminal 134, is a downgoing pulse. This is an inverted brake enable pulse, which is processed through an isolation circuit, not shown, then is connected with the null detecting trip circuits such as the circuit 80.

The timing of the brake enable pulses 92 is such that only one pulse occurs while the selsyn generator 66 is in a position to cause a signal which is below a trip level 79, as shown on FIG. 12. Consequently, the rotor 16R of the synchronous motor 16 stops at one particular narrow range of angular position with respect to the armature 16A of the respective motor.

Thus when the conveyor 20 comes within a predetermined range of the home position 24, the home position discriminator 68 conditions the null detecting trip circuit 80, and upon the next occurrence of a brake enable pulse at the enabling input terminal 90 the null detecting trip circuit 80 produces a logic 1 at its output terminal 89. The motor 16 stops at the home position and its brake 98 is applied.

If the conveyors 30, 40 of the other two machines 12, 14 respectively, are already at their home positions 34, 44, the subsequent arrival of machine 10 at its home position produces a sequence of events in which all three of the machines 10, 20, 30 are started simultaneously from their home positions in synchronism at a creep speed and gradually accelerated to a higher operating speed, as will now be described with the aid of FIG. 2.

With all three of the machines in their home positions all three of the null detecting trip circuits such as circuit 80, have logic 1 output signals which are applied to inputs of an AND gate 102. The AND gate 102 has a fourth input terminal 104 which is already enabled by means of a logic 1 from the start switfh 48. Consequently, the AND circuit 102 produces a logic 1 signal at its output, which is connected to a SET terminal of the speed command flip-flop 62, and the speed command flip-flop 62 flips to a condition in which the $\overline{Q}$ output is 0. This 0 signal is applied on a circuit 96 to all three of the AND gates such as gate 94, whose outputs respond by going to zero. This energizes all of the motors 16, 26, and 36 with armature voltage produced by the inverter 58, and releases the brakes of all three of the motors. The motors all start driving their respective conveyors away from their home positions in synchronism.

At the same time the Q output of the speed command flip-flop 62 goes to logic 1 level, which initiates generation of a ramp voltage in circuit 63 to serve as an increasing reference voltage that gradually increses the frequency of the voltage-controlled oscillator 64 from an initial creep speed up to a normal operating speed. The reference voltage generator 63 is a circuit of routine design that produces a low output voltage when Q is 0, a high output voltage when Q is 1, and changes gradually from one of these voltages to the other in a voltage ramp fashion upon a change in Q. Thus the circuit 63 can be an up-down counter that counts pulses of a constant-frequency clock up to an upper limit or down to a lower limit, and having gates to connect the clock pulses to the up-count input terminal of the counter for an increasing ramp and to the down-count input terminal of the counter for a decreasing ramp. A digital-to-analog converter converts the count to an analog voltage ramp in a manner well known in the prior art. The voltage-controlled oscillator 64 controls the frequency of the inverter 58. Consequently, all of the motors accelerate up to normal operating speed while maintaining their synchronous relative positions. They start in synchronism because the rotor of each of the three was assumed to be initially in a particular predetermined angular position or else was driven at creep speed to such a predetermined angular position and stopped there, before all of the motors were started in synchronism. In the embodiment presently being described all of the rotor positions are alike relative to the respective armature windings. In other embodiments the rotor positions could be different, and the differences could be compensated by differing phases of excitation among the motors.

Normally all three of the machines 10, 12, 14 are already in a home position when a start sequence is initiated, because of the manner in which they are stopped, as described in more detail hereinbelow. In such a situation, all three motors have power applied to their armature winding immediately and all three brakes release immediately upon inverter starting, without the necessity for first moving any of the motors to their home positions.

It should be noted that in the preferred embodiment in order for a machine to be in a home position it is necessary not only that the conveyor of a machine be within a predetermined range as indicated by its selsyn transformer, but also that the rotors of the motors all be in predetermined angular positions in relation each to its own stator, i.e. armature. Each rotor is moved to its home position under the magnetic force of a rotating magnetic field produced by the respective armature winding. To stop, the armature is de-energized at a particular phase angle of the ac wave and therefore at a particular angular position of the rotor with respect to the stator. However, there may be several discrete rotor positions, spaced apart around the armature of the motor, corresponding to this one electrical phase angle. For example, in a two pole machine there are two such positions of the rotor, and in an eight pole machine there are eight such positions, as indicated by the positions a, b, c, d, e, f, g of motor 16 in FIG. 1. However, only a particular one of these possible discrete rotor positions is occupied by the rotor while the conveyor is within the range of conveyor positions for which the selsyn position detector indicates a home conveyor position. Within that range, the brakes are enabled by a precisely time brake enable pulse. Consequently, the rotor of a motor 16 always stops near a particular one of the discrete mechanical angular positions discussed above, and relatively precisely.

When the motors are all to be started from their home positions simultaneously, the inverter starting is synchronized by the time circuit 54 such that the first-occurring 1/6 cycle of the inverter's output wave form places an armature magnetic field pole at the home position of the rotor. If some initial error is present in the position of a rotor due machine back-lash, brake slippage, etc. the rotor moves backward or forward upon starting, up to as much as 1/3 of a pole position, to correct the error automatically and align the rotor quickly with the rotating magnetic field produced by the stator. If the position error of a rotor is greater than 1/3 of a pole position the motors are not started simultaneously because the selsyn circuit of the out-of-position conveyor causes an out-of-position signal at the "all home" AND gate 102 and causes a start sequence to be initiated as described above. In such a case only the out-of-position machine is operated, at creep speed, until it is brought into position.

When the motors are started in synchronism, the armatures of all of the motors are energized in common by the one inverter 58. All of the armatures have the same electrical starting phase angle on the inverter waveform. The angular positions of the magnetic fields produced by the armatures are always the same when the motors are being simultaneously in synchronism because the motors are always energized by the circuit 96 in response to the timing of a brake enable pulse, which always occurs with a particular and common phase angle of the inverter wave form. Since all rotor mechanical positions are alike, the rotors of all machines are in the same positions relative to the respective magnetic fields produced by their armatures.

When the machines are to be stopped the command switch 48 is opened, putting a logic 0 signal at the input terminal of a stop command inverter 106. The output signal of the stop command inverter 106 is connected so as to reset the speed command flip-flop 62. Upon this reset the Q output terminal of that flip-flop goes to zero logic level and the frequency reference generator 63 controls the voltage-controlled oscillator 64 to start a decreasing frequency ramp. The motors decelerate as the inverter frequency decreases. After a time the predetermined frequency threshold is reached and the frequency sensitive relay 108 is actuated to produce an FT (frequency threshold) signal. The next time thereafter that the conveyors arrive at their home positions 24, 34, and 44, and the phase of the inverter waveform reaches a predetermined angular range so a brake enable pulse is produced by the brake enable logic circuit 109, the power is removed from all three of the motors and the brakes are applied to stop and hold the motors in their home positions.

The inverter stops at the end of predetermined time delay established by a time delay circuit 110. If one or more of the machines fails to reach the home position within the predetermined time, brakes are not applied to machines that are not in a home position, but brakes are subsequently applied if and when the machines are moved into their home positions.

FIG. 13 shows the uneven cogging manner in which the synchronous motors 16, 26, 36, operate when running at creep speed. The machines of the embodiment being described cog with three steps, corresponding to the three phases of ac power, for each pole of rotation of the rotor. Each pole represents 180 electrical degrees and, in the 8-pole motor being described, represents 45 mechanical degrees. The timing of the brake enable pulses 92 is seen in FIGS. 10 and 13 to be such that the brakes are enabled when the rotor of a motor is in a slower half of a cycle of its cogging motion. This facilitates stopping the rotor at a particular predetermined position. Upon starting again later, the chances are reduced that the rotor will slip a pole position with respect to the stator.

What is claimed is:

1. In a system having a plurality of machines each including a synchronous motor with an armature winding for producing a magnetic field and a rotor non-slippably coupled with a respective movable machine member, apparatus for synchronizing the relative positions of the plurality of machines comprising means for detecting when the rotor of each of said motors is in a predetermined angular position relative to its respective armature winding and producing a first signal thereupon and stopping means responsive to occurrence of said first signal of the machine to stop rotation of said rotor proximate said predetermined angular position, said rotor position relative to said respective armature winding being substantially the same for all of said motors, and means for subsequently starting and accelerating all of said machines simultaneously from their predetermined angular positions while maintaining position synchronization of said machines, said starting and accelerating means including means for energizing the armature windings of all of said motors simultaneously all with the same phase of A.C. voltage to maintain an instantaneous angular position of armature magnetic field with respect to said predetermined angular position of the respective rotor that is substantially the same for all of said motors.

2. Apparatus for synchronizing the relative positions of a plurality of machines as defined in claim 1 wherein said means for detecting when the rotor of each of said motors is in a predetermined angular position comprises means for applying ac voltage to the armature winding of a motor not already at said predetermined position and means for detecting when the instantaneous phase of said ac voltage applied to the armature of said motor is approximately at a predetermined phase while said motor is operating before said stopping means stops said rotor.

3. Apparatus for synchronizing the relative positions of a plurality of machines as defined in claim 2 and wherein said means for applying ac voltage comprises three-phase power source means, and said means for detecting said instantaneous phase comprises means for detecting when two phases of said three-phase power source are of like polarity with respect to neutral potential of said source.

4. Apparatus for synchronizing the relative positions of a plurality of machines as defined in claim 1 and further comprising means for sensing the speed of said motors and producing a low-speed signal when said speed is below a predetermined threshold, and means responsive to said low-speed signal to enable and disable said stopping means when said speed is below and above said predetermined threshold respectively.

5. Apparatus for synchronizing the relative positions of a plurality of machines as defined in claim 1 and further comprising apparatus for synchronously increasing the speed of said motors by increasing the frequency of said energizing means after starting all of said machines in synchronism, and means for decreasing said frequency to below a threshold speed in preparation for stopping of all of said machines in synchronism at said predetermined positions.

6. Apparatus for synchronizing the relative positions of a plurality of machines as defined in claim 1 and wherein said stopping means comprises means for de-energizing the armature windng of the respective motor and for applying a brake to the machine at said predetermined position.

7. Apparatus for synchronizing the relative positions of a plurality of machines as defined in claim 1 and wherein said means for energizing comprises static inverter means employed in common for energizing all of said motors.

8. Apparatus for synchronizing the relative positions of a plurality of machines as defined in claim 1 and further comprising means for operating each of said motors at a creep speed to reach said predetermined angular position of the rotor, and wherein each of said motors comprises a motor that rotates with non-uniform velocity in steps when operating at creep speed, and wherein said predetermined angular position of said rotor is a position corresponding to a slower portion of one of said steps of non-uniform velocity.

9. Apparatus as defined in claim 1 and further comprising means for producing a start command signal, and means responsive to said start command signal for energizing each of said machines to move to their respective predetermined angular positions.

10. Apparatus for synchronizing the relative positions of a plurality of machines as defined in claim 1 and further comprising means for sensing when the position of the respective movable member is in a predetermined range and producing a second signal thereupon, and wherein said stopping means is responsive to arrival of the machine at a home position as indicated by said first and second signals to stop said machine.

11. Apparatus for synchronizing the relative positions of a plurality of machines as defined in claim 10 and wherein said means for sensing when the position of the respective movable members is in a predetermined range and producing a second signal comprises a transformer device energized by ac power and arranged so that the magnetic coupling between two windings of said transformer device depends upon the position of said respective movable member of said machine.

12. A method for synchronizing the relative positions of a plurality of machines each having a synchronous motor with an armature winding for producing a magnetic field and a rotor coupled through a non-slip coupling with a respective movable machine member comprising the steps of sensing whether or not the position of the movable member of each machine is within a respective predetermined range and producing a member position signal accordingly, in response to said member position signals, energizing the armature winding of each of those of said motors whose respective movable members are not within respective predetermined ranges, to operate those motors, detecting when the rotor of each of said motors is in a predetermined angular position relative to its respective armature winding and producing a rotor position signal thereupon, said predetermined angular position of each of said rotors relative to its respective armature winding being substantially the same for all of said motors, stopping each of said machines with its rotor proximate said respective predetermined angular position in response to indications by said member position signal and said rotor position signal that said machine is in a home position corresponding to both said predetermined range and said predetermined angular position, detecting when all of said machines are in their respective home positions, and starting and accelerating all of said machines in synchronism by energizing the armature windings of all of said motors simultaneously all with the same phase of A.C. voltage while maintaining position synchronization of said machines to maintain an instantaneous angular position of armature magnetic field with respect to said predetermined angular position of the respective rotor that is substantially the same for all of said motors.

13. A method for synchronizing the relative positions of a plurality of machine as defined in claim 12 and wherein said step of energizing the armature winding of each of those of said motors that are not within the range comprises energizing with ac excitation, and said step of detecting when the rotor is in a predetermined angular position sensing when the phase of ac excitation is within a predetermined range of phase.

14. A method for synchronizing the relative positions of a plurality of machines as defined in claim 12 and further comprising the steps of sensing whether or not the speed of each of said motors is below a predetermined speed threshold, and enabling said step of stopping each of said machines only when said speed is below said threshold.

15. A method for synchronizing the relative positions of a plurality of machines are defined in claim 12 and further comprising the step after all of said machines are operating in synchronism of sensing when each machine is at a home position by sensing for each machine said signals indicating that the movable member and the rotor thereof are at said predetermined range and predetermined angular position respectively, and stopping all of said machines in synchronism in response to sensing said signals.

16. A method for synchronizing the relative positions of a plurality of machines as defined in claim 15 and further comprising the steps of automatically accelerating said machines in synchronism subsequent to said step of starting in synchronism, by increasing the frequency of ac voltage by which all of said motors are excited, producing a stop command, automatically decelerating all of said machines in synchronism in response to said stop command by decreasing said frequency, and sensing when the speed is below a predetermined threshold, prerequisite to said step of stopping all of said machines in synchronism.

* * * * *

UNITED STATES PATENT AND TRADEMARK OFFICE
CERTIFICATE OF CORRECTION

PATENT NO. : 3,967,170

DATED : June 29, 1976

INVENTOR(S) : Ian M. MacDonald; Charles J. Cowie

It is certified that error appears in the above-identified patent and that said Letters Patent are hereby corrected as shown below:

Col. 1, line 17:     add "a" after "by".

Col. 2, line 23:     Add "a" after "of".
       line 66:     Add "in" after "are".

Col. 3, line 5:     Add "a" after "as".

Col. 5, line 58:     Switch is misspelled.

Col. 6, line 6:     Increases is misspelled.
       line 24:     Add "a" after "to".

Col. 7, line 2:     Change "time" to "timed".
       line 8:     Change "time" to "timing".

Signed and Sealed this

Ninth Day of November 1976

[SEAL]

Attest:

RUTH C. MASON
*Attesting Officer*

C. MARSHALL DANN
*Commissioner of Patents and Trademarks*